Figure 1:
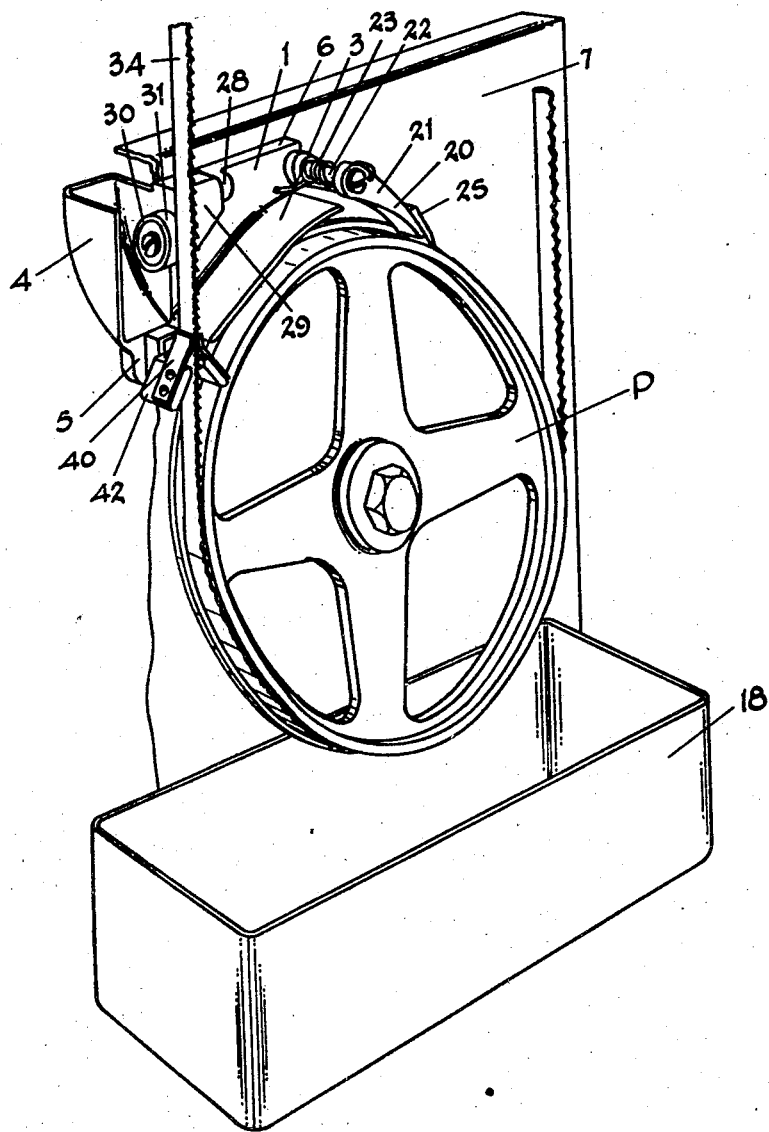

July 1, 1947. V. G. BIRO 2,423,363
CLEANING UNIT FOR POWER MEAT CUTTERS
Filed March 26, 1946 2 Sheets-Sheet 1

INVENTOR
Vincent G. Biro
BY
ATTORNEY

Inventor
Vincent G. Biro

Patented July 1, 1947

2,423,363

UNITED STATES PATENT OFFICE 2,423,363

CLEANING UNIT FOR POWER MEAT CUTTERS

Vincent G. Biro, Ottawa County, Ohio, assignor to The Biro Manufacturing Company, Marblehead, Ohio, a corporation of Ohio Application March 26, 1946, Serial No. 657,079

2 Claims. (Cl. 143—157)

My invention relates to the art of power driven meat cutting machines. Particularly, the invention relates to meat cutting machines having a continuous substantially flexible blade provided with a plurality of cutting teeth and tensioned between a pair of pulleys, one of which may be power driven to move the blade for meat cutting action. Such a power meat cutting machine is illustrated and described in United States Letters Patent No. 1,793,461, issued February 24, 1931, to Carl G. Biro.

My invention has for an object to provide a readily attachable and demountable cleaning unit. Structurally integrated with said cleaning unit is means for guiding the blade, means for cleaning both lateral surfaces of the web of the blade, means for cleaning the web engaging felly of the blade supporting pulley and means for directing material removed by the cleaning means to fall through space, out of the path of movement of the blade and pulley, and into a waste receptacle.

Heretofore, it has been the practice to provide separately attachable and demountable means of the character mentioned, each of which, in the proper cleaning of the machine, required by present-day public health and sanitation regulations, must be separately removed for cleaning and thereafter separately reattached. Obviously, the time required for individual handling of the parts not only extends the time of required machine shut-down, but also adds materially to the labor cost of maintenance. The resultant decreased overall production efficiency has become, with increased labor costs, a matter of considerable consequence to the owner of such machinery. By utilizing a cleaning unit embodying my invention, the operator, in a single operation, may quickly remove the parts performing the several mentioned functions, clean all the parts at one time, and remount the same in operative position, with but little loss of machine productive operation time and at but a slight cost of maintenance.

The invention, also, provides a unit upon which factory-made adjustments of the parts performing the aforesaid function may be effected prior to shipment to the user. In this sense, the invention provides a "packaged" unit ready for installation by unskilled labor at the user's place of business. When the "packaged" unit is thus installed, the user obtains the same performance as though the parts had been installed with the precision and skill of trained factory service personnel.

A still further object is to provide a cleaning unit which, by its conjunction of parts and elements, is simple and less costly than those made available by the prior art.

The invention consists in other features and advantages which will appear from the following description and upon examination of the drawings. Structures containing the invention may partake of different forms and still embody the invention. To illustrate a practical application of the invention, I have selected a cleaning unit for power meat cutters as an example of the various structures and details thereof that contain the invention and shall describe the selected structure hereinafter, it being understood that variations may be made without departing from the spirit of the invention. The particular structure selected is shown in the accompanying drawings and described hereinafter.

Figure 2:
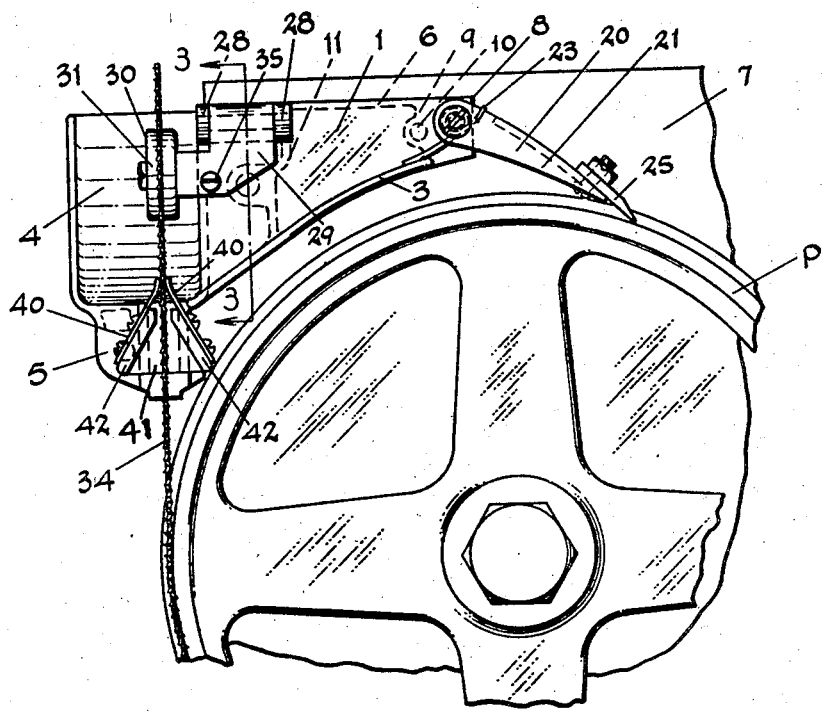

Fig. 1 of the drawings illustrates a perspective view of a cleaning unit embodying the features of my invention. Fig. 2 illustrates a side elevational view of the cleaning unit shown in Fig. 1.

Figure 3:
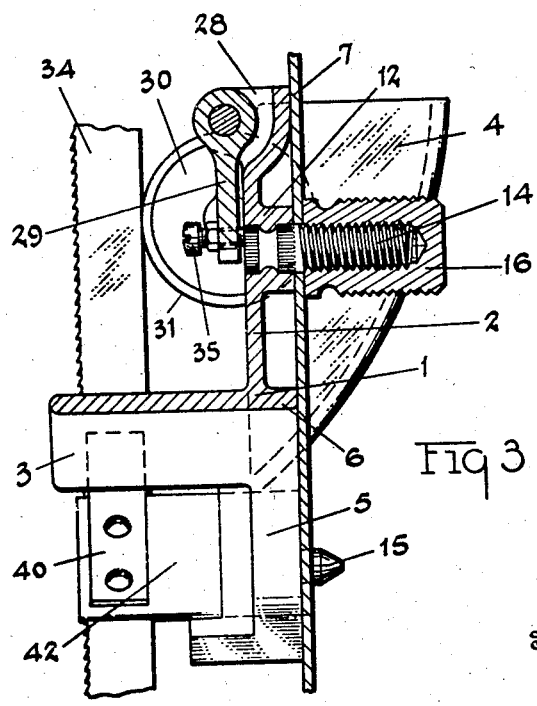

Fig. 3 illustrates a view of a section taken along the plane of the line 3—3 indicated in Fig. 2.

The particular embodiment of the cleaning unit shown in the drawings has a support disposed between the two blade moving pulleys (one pulley P being shown in the drawings) and below the meat cutting plane of the machine. The support is embodied in a casting 1.

The casting 1 has a back plate 2, a laterally extending apron 3, a semi-cup portion 4 and a tongue portion 5. The casting has peripheral ridges 6 which extend from the back side of the plate 2 and are adapted to engage frame part 7 of the cutting machine to support the plate in a plane spaced from the frame part 7.

One end 8 of the casting 1 has a thickened portion 9 from which a pin 10 extends backwardly from the plate 2. Spaced from the end 8 and substantially medial of the casting 1, a rib 11 is provided. The rib 11 has an enlarged lateral boss portion 12 through which the shank of a threaded bolt 14 extends backwardly from the plate. A pin 15 extends backwardly of the plate from a lateral surface of the tongue portion 5.

The pins 10 and 15 and the bolt 14 form means for supporting the unit on the frame part 7. Suitable openings are formed in the frame part 7 into which the pins 10 and 15 and the bolt 14 register. The threaded shank of the bolt is engaged by a cap nut 16 to removably lock the unit to the frame part 7. Thus, the mounting and removal of the unit requires but the simple operation of threadably engaging or disengaging of the cap nut 16. Correct and proper installment relation is assured by registration of the pins 10 and 15 with their proper taps in the frame part 7.

The apron 3 of the plate 1 extends laterally from the plate 2, a distance sufficient to canopy the pulley P, particularly, the felly of the pulley. The apron 3 serves to shield the felly of the pulley from contact with the falling shreds of pieces of meat projected into space in the cutting operation or by the various blade or pulley cleaner parts hereinafter mentioned. The apron 3 is pitched slightly in its lateral dimension to cause the shreds or pieces of meat to roll off the apron into the catch pan 18.

In order to clean the felly of the pulley and maintain it clean, a felly scraper 20 is mounted on the plate 1. The scraper 20 comprises an arm 21 pivotally mounted, as by the pin bolt 22, on the casting 1. A suitable coil spring 23, one end of which engages the arm 21 and the other the apron 3, is disposed about the pin bolt 22 and constrains the arm 21 to yieldingly engage the felly of the pulley P. A suitable scraper blade 25 is removably mounted on the end of the arm 21. The sharpened felly contacting edge of the blade 25 is of sufficient length to span the felly. As the pulley rotates, in operation of the meat cutter, the blade dislodges shredded particles and the like of meat from the felly, and directs them to fall into the scrap pan 18. The blade scraping action by virtue of the constraint of the spring 23 is also sufficient to remove a large percentage of the meat greases and oils from the felly of the pulley. If these greases are not removed, they lubricate the felly to an extent that the desired driving friction between blade and pulley cannot be maintained. Consequently, it is desirable to regularly remove the blade for cleaning, sharpening and adjusting. This can be done at the time the casting 1 and its supported parts are removed for cleaning.

The casting has a pair of spaced trunnion bearings 28 which pivotally support an arm 29 on which the blade guide roller 30 is carried. The roller is rotatably mounted on the arm 29 and is suitably housed by the semi-cup portion 4 of the casting 1. The portion 4 prevents the shreds and pieces of meat, resulting from cutting, from being thrown about and collects the same for discharge into the pan 18. The roller guide 30 is positioned by the arm 29 so that its rim 31 engages the back or non-cutting edge of the cutting blade 34. The roller 30 operates, idler-wise, to give lateral rigidity to the cutting reach of the blade between the pulley P and its counter-part. The roller 30 operates to hold the blade against lateral movement when the meat to be cut is pressed against the cutting edge of the blade. In order to adjust the position of the roller guide, to accord with the depth of the blade web and the proper disposition of the cutting edge, the arm 29 has an adjustable screw stop 35 mounted thereon. The end of the stop 35 engages the plate 2 and limits the angular movement of the arm 29 in a direction to leave the blade without desired and proper support. The shank of the stop 35 may be threaded to engage corresponding threads in the opening in the arm 29 through which the stop extends. Hence, by merely turning the stop 35 the position of the roller guide 30 and its support of the blade may be easily adjusted.

In order to clean both surfaces of the web of the blade 34, a pair of cleaners 40 supported on a bracket 41, mounted on the tongue 5 of the casting 1 is provided. The bracket 41 has a pair of opposed neighboring ears 42 which extend in inclined relation to each other. The proximating ends of the ears 42 are spaced a sufficient distance to allow the blade 34 to pass therebetween. Each cleaner 40 is formed from sheet stock, suitably tempered to permit distortion of a sufficient degree. The cleaners 40 are each mounted on one of the ears 42 so that the edge of each cleaner resiliently presses and engages the web of the blade 34. The cleaners are of a lateral dimension sufficient to span the entire surface of the blade web, without engaging the cutting edge or teeth of the blade. As the blade is drawn between the cleaners 40 in the operation of the cutter, the shreds and particles of meat incidental to cutting which adhere to the blade web are scraped away by the cleaners 40 and caused to fall into the pan 18.

Thus, in the cleaners 40 and the scraper 20, means is provided for operatively cleaning the blade and pulley felly in order that an efficient driving friction may be maintained. In the apron 3 and cup portion 5, means is provided for preventing haphazard contact between the shred particles and the blade pulley. In the roller guide 30, means is provided for sustaining the blade in desired lateral working position, notwithstanding the pressure of cutting action.

All these various parts directly or indirectly contact the meat through the medium of the cutting blade 34. If not regularly cleaned, the shred particles and grease deposited on the parts become dangerous sources of meat contamination. Departments of Health, as a consequence, make regular and periodic inspections, requiring users to maintain the parts in a practical scrupulous condition of cleanliness. Mounting the parts on the casting 1 as provided in the invention enables the user, by the simple unthreading of the cap nut 16, to remove all the parts in a single operation, deposit them in a cleansing, degreasing bath and remount the casting as dictated by the pins 10 and 15 with assurance that the relation of all parts is the same as they were before cleansing. This feature is markedly advantageous and results in material savings in shut-down time and labor cost of maintenance. Further, the facility of cleaning the parts, using my construction, enables repeated cleaning at shorter intervals to the material benefit of the user of the meat cut on the cutter.

It is recognized that the parts have been provided heretofore as separate entities but so far as is known, no one prior to my invention has inter-related and mounted the parts on an integrating unit, as claimed in the appended claims.

I claim:

1. In a power meat cutter machine of the variety having a frame and a continuous band blade tensioned between and moved by two vertically spaced pulleys and having means, including a roller rotatably supported on an arm, for guiding the blade, means, including a pair of resilient scrapers, for cleaning the web of the blade, means, including a scraper, for cleaning the felly of the blade moving pulley, and means, including a guard canopy, for shielding the felly of the blade moving pulley from meat particles falling from the meat cutting plane; the combination therewith of a unit casting forming a support for said several means and disposed below the meat cutting plane of the machine; said casting having a plurality of protuberances extending from one surface thereof and adapted to register and engage with parts of the machine frame, one of said protuberances being threaded to receive a like threaded element to lock the casting on the frame; said casting having trunnion bearings between which the said roller supporting arm is pivotally supported; a spring constrained arm pivotally mounted on the casting for supporting the said scraper; and said guard being integral with said casting and extending laterally therefrom.

2. In a power meat cutter machine of the variety having a frame and a continuous band blade tensioned between and moved by two vertically spaced pulleys and having means, including a roller rotatably supported on an arm, for guiding the blade, means, including a pair of resilient scrapers, for cleaning the web of the blade, means, including a scraper, for cleaning the felly of the blade moving pulley, and means, including a guard canopy, for shielding the felly of the blade moving pulley from meat particles falling from the meat cutting plane; the combination therewith of a unit casting forming a support for said several means and disposed below the meat cutting plane of the machine; said casting having a plurality of protuberances extending from one surface thereof and adapted to register and engage with parts of the machine frame; means adapted to engage one of said protuberances to lock the casting on the frame; said casting having trunnion bearings between which the said roller supporting arm is pivotally supported; a spring constrained arm pivotally mounted on the casting for supporting the said scraper; and said guard being integral with said casting and extending laterally therefrom.

VINCENT G. BIRO.

REFERENCES CITED

The following references are of record in the file of this patent:

UNITED STATES PATENTS

| Number | Name | Date |
| --- | --- | --- |
| 1,793,461 | Biro | Feb. 24, 1931 |